United States Patent [19]

Tsao

[11] 4,208,476

[45] Jun. 17, 1980

[54] STEAM INJECTION EXTRUSION APPARATUS, PROCESS, AND THE RESULTANT PRODUCT

[75] Inventor: Ter-Fung Tsao, Evanston, Ill.

[73] Assignee: The Quaker Oats Company, Chicago, Ill.

[21] Appl. No.: 917,322

[22] Filed: Jun. 19, 1978

[51] Int. Cl.² ............................................... A21D 8/02
[52] U.S. Cl. ..................................... 426/549; 426/458; 426/461; 426/512; 99/483
[58] Field of Search ........................... 425/377, 378 R; 426/549, 805, 455, 458, 461, 512, 496, 511, 560, 391, 446, 449; 99/483; 366/75, 76, 79, 336, 69, 91

[56] References Cited

U.S. PATENT DOCUMENTS

| | | | |
|---|---|---|---|
| 3,502,041 | 3/1970 | Lotz | 425/377 |
| 3,595,671 | 7/1971 | Cooke et al. | 426/549 |
| 4,022,915 | 5/1977 | Zukerman | 426/72 |
| 4,107,341 | 8/1978 | Seiling | 426/549 |
| 4,118,164 | 10/1978 | Wenger et al. | 425/378 R |
| 4,126,706 | 11/1978 | Hilton | 426/458 |

*Primary Examiner*—R. B. Penland
*Attorney, Agent, or Firm*—Joseph P. O'Halloran

[57] ABSTRACT

Steam injection into a thermoplastic extrudate as it leaves an extruder followed by mixing of the steam with the extrudate to raise the temperature and moisture content of the extrudate and lower viscosity forms a suitable product from a thermoplastic dough at an increased output. This is accomplished by extruding a thermoplastic dough, adding steam through an injection means into the extrudate as it exits from the extruder followed by mixing of the steam with the extrudate using a mixing means. The steam injection means and the mixing means are located in an enclosed transfer means between the extruder outlet and the actual outlet of the product from the enclosed transfer means. The increased output may be handled by any suitable recovery means.

15 Claims, 3 Drawing Figures

STEAM INJECTION EXTRUSION APPARATUS, PROCESS, AND THE RESULTANT PRODUCT

BACKGROUND OF THE INVENTION

This invention relates to food and more particularly to a thermoplastic food formed by an extrusion apparatus having a steam injection means and mixing means combined therewith to provide a process for producing a food, the process, and the resultant apparatus.

Within the food processing art, a common piece of machinery which achieves a number of purposes is an extruder. The extruder is basically a tubular device having one or more rotatable screws mounted therein. At one end of the tube, is an inlet for admitting a dough to be processed into a food. The inlet communicates with a feed section of the screw. The screw while rotating within the tube pushes the dough from the feed section through the tube to the transition section of the screw and then to the metering section of the extruder screw. In the transition section of the extruder screw, the components of the dough may be mixed, or cooked, or cooled, or have a desired temperature imparted thereto. The dough may also be cooked further and have its structure altered by high shear as it advances to the metering section. Any number of desired properties can be imparted to a dough having an appropriate composition with proper processing within the extruder. After the metering section, the dough is ready to leave the extruder for further processing.

There are a number of important parameters, such as extruder screw design, revolutions per minute of the screw, back pressure, barrel temperature, die size, output temperature, external temperature of the extruder, dough viscosity, and other parameters, all of which can have a substantial effect on the output of an extruder. For example, to achieve a high, efficient throughput through the extruder, the viscosity of the dough at the inlet needs to be greater than the viscosity of the extrudate at the outlet, thus helping to push the processed dough through the extruder.

As above-mentioned, it is desired to have the dough at the feed inlet at a viscosity sufficiently high to aid in the pumping of the dough through the extruder. This viscosity adjustment is very critical in that it must be high enough to aid in pumping, yet not too high to require a substantial amount of power in this energy conscious age. Generally speaking extrudable doughs have a viscosity in the range of 10 to 200 poise. This viscosity difference between the inlet and outlet of the extruder provides for efficient pumping by the extruder screw through the extruder. As above stated while the dough is being transferred through the extruder it may be mixed, heated, or otherwise treated. Heat applied to the dough while the dough is in the extruder permits gelatinization of starch, denaturation of protein, reduction of microbiological counts and other physical and chemical changes to take place in the dough. Some heat is provided by shear or the friction of the screw turning against the dough (especially in the metering section). Other heat may be applied by a source other than the friction. For example, jackets can be placed around the tube and can be supplied with a heated fluid to indirectly heat the food. The tube may also be heated by electricity, with steam, or in any other suitable fashion.

Usually, the viscosity of a thermoplastic dough decreases with increasing temperature. This viscosity reduction is desirable when the dough is near the outlet of the extruder, because it is not desired to create high back pressures, (by back pressure is meant a pressure which tends to hold the dough in the extruder) and keep the dough within the extruder. It is desired to minimize the back pressure which can reduce the pressure keeping the dough in the extruder and thereby allow the dough to exude from the extruder as an extrudate. Thus, it is clearly desirable to have a higher viscosity for the dough at the extruder inlet than at the extruder outlet. The viscosity at the extruder outlet should be low relative to the viscosity of the food at the extruder inlet.

These aspects of extruder technology are discussed in more detail by Harmann et al *Journal of Food Science*, "Modeling a Forming Foods Extruder" pages 1099–1104, Volume 39, (1974), and Rossen et al *Food Technology*, "Food Extrusion" pages 46, 48–53, August 1973, both articles being incorporated herein by reference.

There are many ways to achieve the desired high viscosity of a dough prior to extrusion—one way being to change the formulation. However, it is also desired that the overall process be efficient and that the final product be acceptable and economical to produce. A change to a high viscosity formulation is not always the best means of achieving overall process efficiency. Another means of achieving a viscous dough at the inlet is to reduce the moisture content of the dough. However, this reduction in moisture at this level must be done while keeping in mind the moisture content required for the final product. Moisture content of the product is a major contributor to palatability, taste, and texture. Moisture content of the product also has a substantial effect on appearance. Thus, the moisture content of the dough cannot be reduced to such a point that it will have an adverse effect on the composition, appearance, or cost of the final product. Yet a dough suitable for extrusion must have a moisture content low enough for the dough to be viscous.

Also, it is desired to heat and pasteurize or process products to a certain temperature during the course of the extrusion. This heating may be started by preheating the dough before it enters the extruder. But such preheating reduces the viscosity and thus makes it more difficult to transfer it through the extruder quickly and efficiently. This problem is especially troublesome with thermoplastic food doughs. The inherent nature of any thermoplastic material (including food) is that it softens or becomes less viscous when heated. Thus if the desired temperature is reached in part by increasing the dough temperature at the inlet the required high viscosity is not maintained.

In view of the extrusion process which results in a substantial heating of the extrudate, moisture again becomes a problem. A portion of the moisture content originally present in the dough as it enters the feed section can be lost as the extrudate exits from the extruder. As is set forth above, the metering section applies both heat and pressure (from shear and other sources) to the extrudate preventing the loss of moisture from the extrudate while the extrudate remains in the extruder. As the extrudate exits from the extruder, however, pressure is released, and the extrudate is exposed to lower temperatures. Basically, the temperature outside of the extruder is less than the temperature inside. This reduction of temperature and reduction of pressure results in moisture flash-off. Thus, the extrudate almost inherently has a lower moisture content than the original dough, because of this moisture flash-off.

An extruder and its backup equipment are capital intensive and energy intensive. To increase the output and efficiency of each extruder is therefore extremely desirable. It is thus obvious that it is extremely desirable to increase extruder output while maintaining final product quality.

SUMMARY OF THE INVENTION

Therefore, it is an object of this invention to provide a process for increasing the extrusion rate.

Also an object of this invention is to provide a process for maintaining the moisture content of an extruded product.

A further object of this invention is to provide a process for raising the moisture content of an extruded product.

A still further object of this invention is to provide a means for maintaining the moisture content of an extruded product.

Yet a further object of this invention is to provide a means for raising the moisture content of an extruded product.

Another object of this invention is to provide a product formed at a higher extrusion rate.

Still another object of this invention is to provide a product having a maintained moisture content.

Yet another object of this invention is to provide an extruded product having an increased moisture content.

These and other objects of this invention are met by providing a steam injector to inject steam into an extrudate formed from a thermoplastic dough as it exits from an extruder into an enclosed space and conveying the extrudate within the enclosed space to a mixer to thereby mix the steam and the extrudate sufficiently so that the steam condenses in the extrudate to provide moisture and heat for a product made from the extrudate.

BRIEF DESCRIPTION OF THE DRAWING

FIG. I is a block diagram of the prior art extrusion process.

FIG. II is a block diagram of the processing apparatus of the invention generally shown at 10.

FIG. III is a pictorial diagram of the extruder 12 in combination with the transfer means 20.

Throughout the specification, and throughout all of the Figures the same numeral applies to the same item.

DESCRIPTION OF THE PREFERRED EMBODIMENTS

Steam injection into an extrudate of a thermoplastic dough as it exits from an extruder directly (directly implies little or no atmospheric exposure) into an enclosed space followed by mixing of steam with the extrudate results in an extruded product having a greater moisture content, higher temperature, reduced viscosity, and results in at a higher extrusion rate. The resultant increase in product output may be handled by any suitable recovery means.

Figure 1:
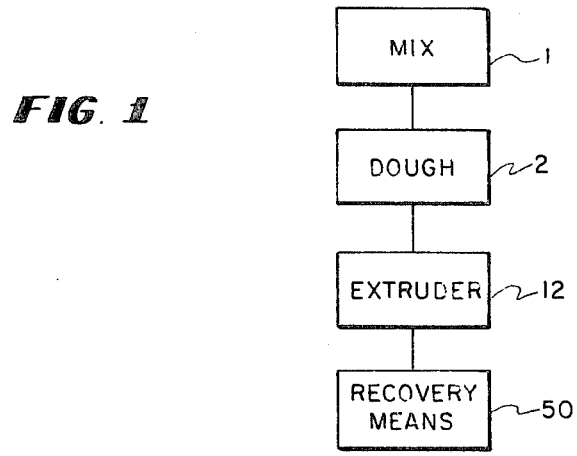
Figure 2:
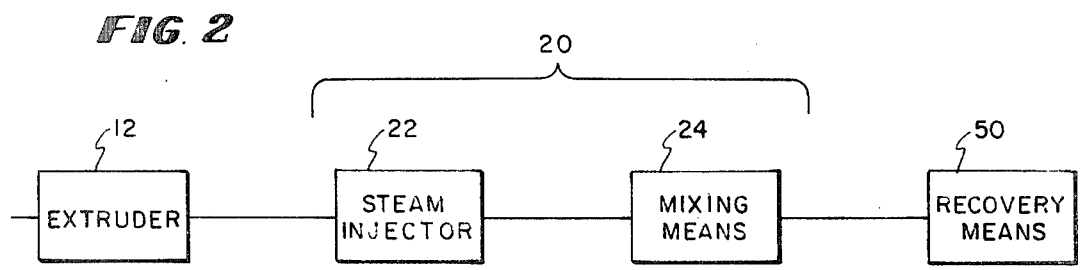
Figure 3:
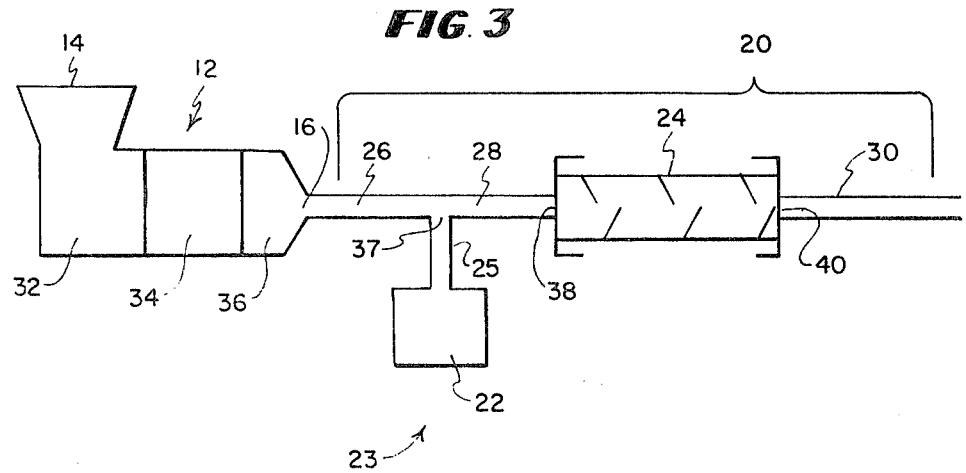

FIG. 1 is a block diagram of a prior art extrusion process and generally depicts a mix 1 of components and water to form a dough 2 which is fed to extruder 12 heated on an all steam profile. The extrudate issues from the extruder 12 at a temperature of about 95° C. to 130° C. (200° F.–266° F.) resulting in flash off of some moisture and is recovered in recovery device 50.

The improvement in the extrusion process of this invention is generally shown in FIG. II and is composed of extruder 12 communicating with a transfer means 20 wherein the transfer means also communicates with recovery means 50. The mix 1 of components and water is again assembled and is again formed into a dough 2 which is fed to an extruder 12 by inlet 14 (in FIG. III). The extrudate passes from the extruder 12 into a transfer means 20. The transfer means 20 comprises a steam injector means 22 communicating with a mixing means 24.

FIG. III is a pictorial diagram 23 generally depicting the extruder 12 having inlet 14, and outlet 16. Transfer pipe 26 communicates with extruder 12 at outlet 16 and the steam injector means 22 at steam point 37 by means of steam pipe 25. Transfer pipe 28 communicates with transfer pipe 26, the steam point 27 and the mixing means 24. Mixing means 24, is shown as an expanded view and may be a static mixer, a propelled mixer, or other suitable mixing device. Transfer pipe 30 is an exit device leading from the mixing means 24 to the recovery means 50 and permitting communication therebetween.

More specifically, the operation of FIG. III is as follows. Viscous dough 2 is formulated and placed into extruder 12 through inlet 14. The extruder 12 is divided into a first feed zone 32 which is adjacent inlet 14, a transition zone 34 adjacent feed zone 32, and a metering zone 36 adjacent transition zone 34 and the outlet 16 of extruder 12. Feed zone 32 can be either heated or cooled. Transition zone 34 and metering zone 36 are heated (not shown) by electricity, by steam, or in another fashion (not shown). Additional zones may also be used. In the normal extrusion operation heating of zones 32, 34, and 36 combined with the time the dough is in the zones 32, 34 and 36 is sufficient to raise the temperature from a low dough temperature to a higher extrudate temperature. For example, a dough which starts at a temperature of 20° C. will be heated usually to around a temperature range of 95° C. to 130° C. (about 200° F. to 266° F.) or higher during extrusion before its extrudate enters transfer pipe 26 through extruder outlet 16. A certain amount of retention time is required in the extruder to raise the dough temperature to the desired range of 95° C. to 130° C. for an extrudate. One usual way of processing is to set the steam pressure in the heated jacket at maximum and then adjust the revolutions per minute of the extruder screw such that the retention time is sufficient in the extruder to obtain the desired temperature at the extruder exit.

In the improved extrusion process described herein, the process is modified by extruding the thermoplastic dough at a lower temperature than is normally required, and then relying on steam injection to raise the temperature of the extrudate so that the final product temperature is somewhere between 95° C. to 130° C. as the final product enters recovery means 50. Since in the improved process, the extrudate temperature, as it exits from the outlet 16, is lower than is usually required for the final product, the retention time in the extruder subsequently can be shortened, thus increasing the output rate. Immediately after exiting from the outlet 16, the extrudate is contacted by steam entering through steam point 27 into transfer pipe 26. This steam is usually injected close to the extruder exit 16. As steam is injected and subsequently mixed with the extrudate, the temperature of the extrudate increases and the viscosity decreases to relieve any back pressure buildup. A suitable location for injecting steam and the means for steam injection is easily determined by experimentation by those skilled in the art in view of this disclosure and is determined by such factors as available floor space, desired temperature of extrudate, etc. Transfer pipe 26 communicates with both outlet 16 and steam point 37. The source of steam (22) can be located anywhere and is connected to the transfer pipe 26 by steam pipe 25 at steam point 37 or in any suitable fashion to permit steam to be injected into transfer pipe 26. Between steam point 37 and mixing means 24 is transfer pipe 28. Transfer pipe 28 communicates with both steam point 37 and transfer pipe 26 at one end and mixing means 24 (shown as expanded) at the other end. The steam extrudate mixing means 24 communicates with transfer pipe 28 at inlet 38. After passing through inlet 38 the extrudate and steam are in the mixing means 24, and mixed thoroughly in the mixing means 24. Mixing means 24 may be a static mixer, a propelled mixer or another suitable device that can adequately mix condensed steam with extrudate. Static mixers are available from the Kenics Corporation of North Andover, Mass.; the Charles Ross and Son Company, Hauppauge, N.Y.; or similar manufacturers. During mixing most of the steam condenses to water, thus raising the moisture content and the temperature of the extrudate. After the extrudate and the steam are mixed sufficiently, the resulting higher moisture and higher temperature extrudate leaves mixing means 24 through outlet 40 of mixing means 24. Outlet 40 communicates with a recovery means 50 via transfer pipe 30. The recovery means may be any suitable device.

Because the extrudate need not come out of the extruder at as high a temperature as in the past due to the now disclosed improvement in the extrusion process of raising the temperature and moisture content of the extrudate by steam injection, it is now possible to pass the extrudate through the extruder faster and reduce the residence time of the dough in the extruder. As is clearly set forth, with all other factors constant, the residence time in the extruder is directly proportional to the desired temperature wanted at the extrudate exit. The fact that steam injection will now raise the temperature of the extrudate after it exits, permits the extrudate to issue from the extruder at a lower temperature and thus at a faster rate.

However, the fact that the time in the extruder can be reduced by using a lower exit temperature requires the further step of making it physically possible to reduce the time given substantially the same standard operating conditions of the extruder. One means of increasing this rate is to make the dough more viscous. At a given revolutions per minute (hereafter rpm) for the extruder, the more viscous dough is generally pumped through the extruder faster then a less viscous dough. Two ways of increasing the viscosity of the dough are to reduce the temperature and/or the moisture which permits the dough to be more visous. The loss of moisture from the dough is compensated for by the injection of steam into the extrudate. The lowered temperature can be achieved by using cold water in the jacket surrounding feed zone 32.

Also generally speaking, the rpm of the extruder screw affect the rate at which the dough moves through the extruder and are inversely proportional to the residence time of the dough within the extruder. Or stated in a different way, the rpm are usually directly proportional to the extrusion rate, the higher the rpm's, the higher the extrusion rate. Thus, adjustments in rpm can affect the residence time of the dough in the extruder. The fact remains that any reduction of residence time in the extruder reduces the temperature of the extrudate if all other features are constant. However, the benefits of reducing the residence time of the dough in the extruder; whether by increased viscosity, reduced moisture or temperature, higher rpm, or other means; are accomplished by the injection of the steam and the mixing of the steam with the extrudate to increase the moisture and temperature. These reductions of residence time in the extruder, of course, assume that the other factors in extrusion are kept relatively constant.

In this fashion, the final product moisture may be raised to any desired level while at the same time achieving the benefits of extruding a lower moisture dough. When the steam treated extrudate is mixed, an even distribution of moisture and heat caused by the steam is achieved throughout the extrudate causing the extrudate temperature to rise uniformily. The rise in temperature in turn reduces the viscosity which results in more flowability and more fluidity to the extrudate. The steam also provides more heating and cooking for the extrudate. It is assumed that the steam injection pressure will exceed the extrudate back pressure at steam injection point.

The process may produce a food having a moisture content of 15 percent to 60 percent. More preferably, it may also produce a food having a moisture content in the semi-moist food range of 20 percent to 50 percent.

Sufficient steam is injected into the extrudate as it exits from the extruder to raise the temperature to any suitable level. Thus even though the dough leaves the extruder at any temperature between 20° C. to 120° C., the steam/injection mixing process is used to raise the temperature of the extrudate to the desired level of between 95° C. to 130° C., and also to raise the moisture content of the extrudate as it leaves the transfer means and enters the recovery means. For example, if a prior art extrusion process and apparatus produces an extrudate that requires a temperature of 120° C., as it exits from the extruder the process and apparatus of this invention can produce an extrudate at a temperature of about 100° C., and then rely on steam injection and mixing of the steam with the extrudate to raise the final product temperature to 120° C. For another example, the extrudate may even have a temperature of 50° C. as it exits from the extruder, but then due to the subsequent steam injection and mixing process, can have a temperature of 120° C. prior to cooling and recovery of the product. Of course, the recovery means serves to cool and package the final product.

As above stated, one advantage of extruding at a lower temperature is that the residence time in the extruder can be decreased in proportion to the reduction of the required extruder exit temperature prior to steam injection and mixing assuming all other factors are constant. On the other hand, if it is not desired to increase the rate of extrusion, the amount of heat required to heat the extruder barrels can be reduced, thus saving in energy costs.

As is clear here and throughout the specification, the term "dough" is applied to the thermoplastic composition being processed into a food while in residence in extruder 12. The term "extrudate" applies to the thermoplastic composition after it exits from the extruder and while in residence in the transfer means 20. The term "food product" applies to the thermoplastic composition while in contact with recovery means 50 and thereafter. Included with and as a part of the recovery means 50 are means for cooling the food product to any desired temperature and means for packaging the food.

The extrudate temperature, after steam injection and mixing, must exceed the extrudate temperature before steam injection by at least one centigrade degree (1C.° or 2F.°) to obtain the benefits of this invention. More preferably, the extrudate temperature after steam injection must exceed the extrudate temperature before steam injection by 3C.° to 50C.°. Most preferably, the extrudate temperature after steam injection must exceed the extrudate temperature before steam injection by 10C.° to 40C.°. For example, a dough extruded at 100° C. upon becoming an extrudate has sufficient steam injected followed by mixing therein to raise the temperature at least 1C.° thus becoming an extrudate having a temperature of at least 101° C.

Also the steam injection raises the moisture content of the extrudate as it condenses and mixes with the extrudate. The final product may have any suitable moisture content in reference to the original dough as long as it meets the required microbiological, structural, and appearance characteristics. Preferably the moisture content of the final product is at least equal to the moisture content of the dough. More preferably, the moisture content of the final product is at least one percent higher than if steam injection were not used. Even more preferably the moisture content of the extruded product is at least 2 percent higher than that normally expected if steam injection were not used. Most preferably, the moisture content of the product is 2 to 20 percent higher than that of the dough.

This process may be applied to a thermoplastic food or pet food using the apparatus as described with suitable recovery means 50. By thermoplastic food dough, is meant that food dough which decreases in viscosity as the temperature increases; or increases in viscosity as the temperature decreases. This terminology is of course applicable also to synthetic resins. However, this terminology clearly applies to food doughs applicable to this invention. The food doughs of this invention must be soft and easily mixable so that the steam may be injected therein. Thus, as long as the food dough being processed is of a thermoplastic nature or becomes thermoplastic in nature as an extrudate, the food dough may easily be processed by this invention. The viscosity of the dough is generally in the 10 to 200 poise range.

Standard food ingredients are combined to form the thermoplastic dough for use in the process and apparatus of this invention. Various protein sources, amylaceous ingredients (amylaceous ingredients are usually in the 1 to 45 percent range or broader) and other ingredients which provide nutrition, structure, texture or palatability for the food can be combined to form the dough. These ingredients are added depending on the type of food desired. If a nutritious food is desired, protein, vitamins, and minerals are used. By "nutritious food" is meant a food capable of sustaining life without other foods. If a snack food is desired, protein, vitamins, and minerals may be reduced or even eliminated. Because no protein is required for a food of this invention, the protein content may be 0 to 60 percent.

If a nutritious food is desired, protein is added to form the food. To meet the nutrition requirements a sufficient amount of at least one protein source is customarily present in an amount to provide a protein content of 10 to 50 percent on a dry basis by weight of the food. More preferably the protein content comprises 15 to 40 percent by weight of the food on a dry basis.

Under National Research Council guidelines, certain requirements are set out for pets. Most preferably, the protein content comprises 22 to 23 percent by weight on a dry basis of the pet food for dogs and 30 to 40 percent for cats. The protein content may be derived from a vegetable protein source, an animal protein source, or mixtures thereof so long as the necessary protein content is met. In this fashion a maintenance pet food is formed. These ranges also apply to nutritious human food.

By "vegetable protein source" is meant those vegetable ingredients normally containing 20 percent or more protein by weight. Example of vegetable protein sources are soybean meal, soy flours, soy protein concentrates, soy protein isolates, cottonseed meal, cottonseed flour, cottonseed protein concentrates, cottonseed protein isolates, peanut meal, peanut flour, peanut protein concentrates, peanut protein isolates, corn germ, corn germ meal, wheat germ, wheat germ meal, corn gluten meal, corn gluten feed, corn distiller's dried grains, dried corn distiller's solubles and any other edible proteinaceous vegetable foodstuff taken singly or in mixtures thereof which are not suitable as proteinaceous adhesives.

By animal protein source is meant a meat, a meat by-product, animal derived protein, or mixtures thereof as defined in U.S. Pat. No. 3,380,832 to Bone incorporated herein by reference. The animal protein source may also be used alone or in combination with the vegetable protein source in the above percentage ranges, so long as the total required protein content as above defined is met. By meat is meant the flesh of cattle, swine, sheep, goats, horses, whale and other mammals, poultry, and fish. By meat by-products is meant the parts of animals shown in the 1976 Association of American Feed Control Officials, Inc. under No. 9 Animal Products, Section 9.3 page 77 which defines meat by-products as the non-rendered clean wholesome part other than meat derived from slaughtered animals. Meat by-products include, but are not limited to lungs, spleen, kidneys, brain, livers, blood, partially defatted low temperature fatty tissue and stomachs and intestines freed of their contents. If it bears the name descriptive of its kind, it must correspond thereto (proposal 1973, adopted 1974-N.R.C. 5-00-395). Animal protein also includes meal and such materials as animal liver meal, animal liver and glandular meal, extracted animal liver meal, whale meal, meat and bone meal, animal by-product meal, dried meat solubles, meat meal, fish meal, fish protein concentrate, poultry parts, poultry by-products, poultry by-product meal, and blood meal. Also proteins derived from animals such as milk proteins, sodium caseinate, egg proteins can be used.

Generally speaking, any one of the above named meat, meat by-products, or animal derived protein sources for vegetable protein products may be used in the semi-moist pet food made under this invention. Also mixtures of two or more of the meat, meat by-products or other animal protein sources may be used in this soft, chewy, semi-moist type pet food. Additionally, meat, meat by-products and other animal protein source mixtures with vegetable protein are suitable for use in the pet food of this invention.

As indicated, the protein source is either a vegetable protein source, an animal derived protein source, a dried animal by-product (that is, a meal), or a combination thereof.

If a semi-moist food is desired, it must contain a microbiological inhibitor system which will stabilize the products against microbiological degradation. While almost any microbiological inhibitor system is suitable for use in the semi-moist food of this invention in an amount sufficient to provide microbiological stability, there are three systems that are especially operable for the purpose of this invention. A first system for microbiological stability may be defined as a low sugar, high polyhydric alcohol content microbiological stability system. This first system is exemplified by Canadian Pat. No. 1,020,399 to Burkwall incorporated herein by reference. A second system for microbiological stability is a high acid and low polyhydric alcohol content system. This second system is exemplified in U.S. Pat. No. 4,011,345 to Bartsch incorporated herein by reference. A third system for microbiological stability is a high sugar or high water soluble solute content system. This third system is exemplified by U.S. Pat. No. 3,202,514 to Burgess, incorporated herein by reference. These systems may be used singly or in combination and with other systems so long as microbiological stability is achieved.

If the first system is used the microbiological stabilizer system for the semi-moist pet food of this invention comprises at least one polyhydric alcohol. A typical polyhydric alcohol component suitable for use in this invention is disclosed in the Canadian patent to Burkwall above-referenced. Preferable polyhydric alcohols are propylene glycol and 1,3-butanediol used individually or in combination. From about 2 to 20 percent of the polyhydric alcohol alone or in combination with sugar is used to stabilize the product by preventing microbiological growth. While the sugar as above defined also contributes to the stability of the pet food by lowering the water activity, sugar is not required.

If the second system is used, a means of achieving semi-moist stability is to adjust the pH of the food product to 4-6 and use 3-9% polyhydric alcohol. No sugar is used or required but small amounts may be optional for flavor, or palatability. Typical foodgrade acids for use to adjust the pH in the semi-moist food include acetic acid, lactic acid, adipic acid, succinic acid, and inorganic acid such as phosphoric acid, sulfuric acid, hydrochloric acid, or mixtures thereof. Furthermore, the foodgrade acid salts, which may be used to adjust the pH of the food, include monocalcium phosphate, monosodium phosphate, aluminum sulfate, aluminum ammonium sulfate, aluminum calcium sulfate, aluminum potassium sulfate, aluminum sodium sulfate, and mixtures thereof.

If the third system is used, large amounts of sugar or water soluble solutes such as polyhydric alcohol are used to substantially reduce the water activity and stabilize the food from a microbiological standpoint. Typical sugars used are sucrose and corn syrup. By "sugar" is meant any edible sugar used in the food art. Substantial examples of suitable sugars for use in the food art are listed in U.S. Pat. No. 3,202,514 to Burgess, et al. incorporated herein by reference. A suitable amount of sugar or water soluble solutes for use in this product ranges from about 15 percent by weight to about 35 percent by weight of the final product.

An antimycotic may be added to all three of the above microbial inhibitor systems in an amount sufficient to aid in preventing mold growth. The antimycotic is generally an edible antimicrobial acid or acid salt. The antimycotic is present in the food in an amount of 0 to 1 percent by weight of the pet food. More preferably, the antimycotic is present in an amount of 0.01 to 0.9 percent by weight. Typical edible acids and their salts suitable for antimycotic use include benzoic acid, the benzoate salts, the paraben salts, propionic acid, and the propionate salts, acetic acid and the acetate salts, sorbic acid and the sorbate salts and mixtures thereof. Especially preferred antimycotics are potassium sorbate and sorbic acid.

Various other common additives from 0 to about 25 percent may also be added to the food whether it is a semi-moist food or not. Fat is usually added in an amount from 0 to about 12 percent by weight of the final product depending on how much fat is naturally contained in the meat or meat by-products used. The fat may be of either animal or vegetable origin. A preferred fat for use in a pet food is an animal fat exemplified by prime steam lard, tallow, and choice white grease.

For flavor and nutritional purposes common additives include a variety of salts to be added to this pet food. Typical salts suitable for use in this invention include iodized salt, regular salt, potassium chloride, and other suitable edible salts. Vitamins, supplements, mineral supplements, colorings, flavorants and antioxidants are generally present in the pet food in a sufficient amount (generally about 0 to about 5 percent) to provide nutrition and to add to overall appearance. Included in the vitamin and mineral supplements are ingredients such as choline chloride, magnesium oxide, vitamin A, $B_{12}$, $D_3$, and E, riboflavin, niacin, folic acid, pyridoxine hydrochloride, thiamine mononitrate, calcium pantothenate and other suitable vitamins and minerals.

The process of this invention is especially applicable to the compositions disclosed in U.S. Pat. No. 3,765,902, to Charter; U.S. Pat. No. 3,380,832 to Bone; and U.S. Pat. No. 4,044,158 to Burkwall—all of these patents being incorporated herein by reference. The process of this invention modifies and improves upon the processes of these references. These patents are all directed to a marbled, meat-like pet food made from a thermoplastic dough. For the purposes of this invention the thermoplastic doughs disclosed therein are reduced in moisture content to increase the dough viscosity and can be extruded at an increased rate. Steam is then injected into the extrudate followed by mixing as disclosed in this application to thereby raise the temperature of the extrudate and reduce the overall amount of energy required to extrude the product. Or alternatively, the dough is extruded at a lower temperature followed by steam injection and mixing to raise the temperature of the extrudate to the desired temperature. By extruding at a lower temperature a higher output can be achieved. As above stated, this process is especially effective as a modification of the Charter process.

Even though the concept of this invention can be readily understood from the above description by one having ordinary skill in the art, the following examples are presented to guarantee a complete understanding of the invention without limiting the invention. Both the English system and the metric system of measurements are given in some cases. This complies with patent request for use of the metric system while at the same time giving the actual data derived in its English system for comparison. Applicant is relying herein on the English system and desires to be bound only by the English system definition. All parts and percentages recited here and throughout the specification are by weight unless otherwise specified.

EXAMPLE 1

The ingredients listed in Table I are assembled and formulated into Composition 1 (colored red) and Composition 2 (colored white) in a standard fashion. Composition 1 and Composition 2 of Table I are each divided into two parts.

A first or control part of Composition 1, and Composition 2 is mixed with 10 parts by weight water to form a dough and both doughs are processed separately in a standard fashion as described in U.S. Pat. No. 3,765,904 and according to FIG. I and then blended together, cooled and packaged to form a marbled product. The marbled extrudate temperature as the product leaves the extruder to fall onto the cooling belt is 110° C. (230° F.) due to all zones (32, 34, 36 as depicted in FIG. III) of the extruder being heated.

The second parts of Composition 1 and Composition 2 are formulated into dough in the same fashion—Composition 1 being formulated into a red dough and Composition 2 being formulated into a white dough. Each dough is then extruded in the apparatus according to FIG. II. While separate extruders are used, the same terminology applies to each dough. The first zone 32 of the extruder is cooled (instead of heated) while the other two zones 34 and 36 are steam heated at the same steam pressure as used for control, 32 Because of the increased viscosity of the dough as it travels through the first zone 32, the extrudate output is increased even though the rpm's remain constant since the more viscous dough tends to push the hot extrudate through faster. Because of the increased output the extrudate temperature as it exits from the extruder is 70° C. instead of the standard 110° C. The doughs as separately extruded are permitted to pass from the extruder into transfer pipe 26 at a temperature of 70° C. (158° F.). Each extrudate is then injected with steam at steam point 327. The steam injected extrudate is then passed through a transfer pipe 28 through a Kenic static mixer (an example of mixing means 24), where the extrudate and the condensed steam injected therein are thoroughly mixed. The temperature of the extrudate after mixing is raised to 110° C. Approximately 8 percent condensed steam is added to the formulation prior to exit from the extruder by this steam injection-mixing process to raise the temperature from 70° C. to 110° C. After a normal flash-off value of 4 percent the final product will have 4 percent more moisture than control product. The red extrudate and the white extrudate are then blended together in a recovery means such as that of Charter to produce a marbled meat-like food that is comparable to that formed in the control experiment above. Also because of the higher output through the extruder, the overall output of the latter product is significantly increased over control product produced in normal fashion. And the final product moisture is increased approximately 4 percent over that of control because of the steam injection-mixing process, resulting in a higher yield and softer, more palatable product.

Table I

| Ingredients | Composition 1 83.3 Percent Red A (Base) Parts by Wgt. | Composition 2 16.7 Percent (Marbling) Parts by Wgt. | Percent Final Composition |
|---|---|---|---|
| Beef By-Products | 27 | 27 | 27 |
| Sugar | 24 | 24 | 24 |
| Sodium Caseinate | 9 | 9 | 9 |
| Propylene Glycol | 7 | 7 | 7 |
| Corn Starch | 7 | 7 | 7 |
| Soy Protein Concentrate Pregelatinized | 4 | 4 | 4 |
| Wheat Feed Flour | 3 | 3 | 3 |
| Animal Fat | 2 | 2 | 2 |
| Vitamin Mix, Mineral Mix, color and antimycotic | 7 | 7 | 7 |
| | 90 | 90 | 90 |

EXAMPLE 2

The ingredients listed in Table I are again assembled and formulated into Composition 1 (colored red) and Composition 2 (colored white) in a standard fashion. Composition 1 and Composition 2 of Table I are each divided into two parts.

A first part or control of Composition 1, and Composition 2 is each mixed with 10 parts by weight water to form a dough and both doughs are processed in a standard fashion as described in U.S. Pat. No. 3,765,904 and according to FIG. I and then blended together and recovered to form a marbled extrudate. The extrudate temperature as each extrudate exits from the extruder to fall onto the belt is 110° C. (230° F.) due to all zones of the extruder being heated.

The second parts of Composition 1 and Composition 2 are mixed with only six parts by weight of water (not ten parts water as the control of each composition) thereby providing doughs of part 2 having a greater viscosity than control doughs. Composition 1 is formulated into a red dough and Composition 2 is formulated into a white dough. Each dough is then extruded in the apparatus according to FIG. II at the same rpm as control doughs. Because of the lowered moisture content and the increased viscosities of the dough, the doughs are extruded at a higher rate than if less viscous. The higher rate or reduced retention time in the extruder lowers the temperature of the extrudate as it exits from the extruder to be less than 100° C. While separate extruders are used, the same terminology applies to each dough. Each extrudate is then injected with steam at a point similar to steam point 37. The steam injected extrudate is then passed through a transfer pipe similar to transfer pipe 28 through a Kenic static mixer (an example of mixing means 24), where each extrudate and the steam injected therein are thoroughly mixed to raise the temperature to 110° C. The red extrudate and the white extrudate are then blended in a recovery means such as that of Charter, to produce a marbled, meat-like food. The moisture content of the food formed from part 2 is equal to that of control even though parts less of water was used. Also the rate of extrusion of the part 2 product is greater than that of control product.

EXAMPLE 3

The ingredients listed in Table I are assembled and formulated into Composition 1 (colored red) and Composition 2 (colored white) in a standard fashion. Composition 1 and Composition 2 of Table I are each divided into two parts.

A first part or control of Composition 1 and Composition 2 is mixed with 10 parts by weight water to form a dough and is processed in a standard fashion as described in U.S. Pat. No. 3,765,904 and according to FIG. I to form a marbled extrudate. The marbled extrudate temperature as the product leaves the extruder to fall onto the belt is 110° C. (230° F.) due to all zones of the extruder being heated.

The second parts of Composition 1 and Composition 2 are mixed with only six parts by weight of water (not ten parts water as the first part of each composition was). Composition 1 is formulated into a red dough and Composition 2 is formulated into a white dough. Each dough is then extruded in the apparatus according to FIG. II. While separate extruders are used, the same terminology applies to each dough. All three zones 32, 34 and 36 are steam heated, as is control. However the rpm's of the extruder are increased for composition 1 and 2 such that the temperature of extrusion is 75° C. (175° F.). After exiting from the extruder each extrudate is then injected with steam at a point similar to steam point 37. The steam injected extrudate is then passed through a transfer pipe similar to transfer pipe 28 through a Kenic static mixer (an example of mixing means 24), where each extrudate and the steam injected therein are thoroughly mixed to raise the temperature to 110° C. After blending the red extrudate and the white extrudate in a recovery means such as that of Charter, a marbled, meat-like food is obtained.

The product from the second part, wherein steam injection followed by mixing is used to form the product, has a final moisture content of 30 percent which is 2 percent higher than the moisture content of the control product from the first part. Also, the product from the second part using the steam injection/mixing process is produced more than twice as fast as the product of the first part without the steam injection/mixing step. Yet, the texture, appearance, and palatability of both products are substantially the same while the overall amount of energy used is less when using steam injection. This clearly illustrates that the steam injection/mixing method may be used to produce a substantially equivalent product while increasing the rate of production.

EXAMPLE 4

The procedure of Example 1 is repeated with the ingredients of Table II wherein corn syrup replaces sugar. The first part or control of each composition is mixed with 9 parts by weight water and extruded in the normal fashion. The second part is also mixed with 9 parts by weight water and extruded at a lower temperature (and faster rate) followed by the steam injection and mixing process improvement procedure. The steam injected product (second product) is again produced faster than the control product without steam injection, and is also substantially equivalent to the product (first product) produced without steam injection. The second product also contains 2 percent more moisture than the first product.

Table II

| Ingredients | Composition 1 83.3 Percent Red A (Base) | Composition 2 16.7 Percent White B (Marbling) | Percent Final Composition |
|---|---|---|---|
| Beef By-Products | 27 | 27 | 27 |
| Corn Syrup | 24 | 24 | 24 |
| Corn Starch | 7 | 7 | 9 |
| Sodium Caseinate | 8 | 8 | 8 |
| Propylene Glycol | 7 | 7 | 7 |
| Soybean Flour | 6 | 6 | 6 |
| Animal Fat | 2 | 2 | 2 |
| Pregelatinized Wheat Feed Flour | 2 | 2 | 2 |
| Vitamins, Minerals, Color, and antimycotic | 8 | 8 | 8 |
| | 91 | 91 | 91 |

EXAMPLE 5

The procedure of Example 1 is repeated both with steam injection/mixing process and without steam injection. Without steam injection, about 3,090 kilograms (10,200 pounds) of product are produced each hour. With a steam injection pressure of 16,900 grams per square centimeter (240 pounds per square inch gauge), a production rate of 4,630 kilograms (14,000 pounds) per hour is obtained.

Having fully described and disclosed the invention, what is claimed and desired to be secured by Letters Patent of the United States is:

1. A process for producing a food by extrusion at an increased rate comprising:
   (a) forming a thermoplastic dough having a moisture content sufficient to render the dough extrudable;
   (b) extruding the dough through an orifice to form an extrudate having a temperature when it exits the extruder low enough to cause steam to condense thereon;
   (c) injecting steam into the extrudate as the extrudate exits the extruder;
   (d) admixing the steam and the extrudate to thereby condense at least part of the steam to water and uniformly distribute the water throughout the extrudate to thereby raise the temperature and increase the moisture of the resulting processed extrudate;
   (e) shaping the resulting processed extrudate into the product; and
   (f) recovering the product.

2. The process of claim 1 wherein the extruding is accomplished by transporting the dough through an extruder having at least a extruder screw first feed zone having means for heating or cooling the dough, and at least an extruder screw metering zone wherein: the dough contacts the extruder screw first feed zone first and the extruder screw metering zone last; the dough in the first feed zone being maintained at ambient temperature or lower to thereby maintain the viscosity of the dough as the dough passes through the first feed zone and the dough in said metering zone is heated thereby facilitating the flow of the dough through the extruder.

3. The process of claim 2 wherein sufficient steam is injected into and mixed with the extrudate so that the extrudate temperature after steam injection and mixing exceeds the exit temperature by at least 1C.°.

4. The process of claim 3 wherein sufficient steam is injected into and mixed with the extrudate so that the extrudate temperature after steam injection and mixing exceeds the extruder exit temperature by at least 3C.° to 50° C.

5. The process of claim 4 wherein sufficient steam is injected into and mixed with the extrudate so that the extrudate temperature after steam injection and mixing exceeds the extruder exit temperature by 10C.° to 40C.°.

6. The process of claim 1 wherein sufficient steam is injected into the extrudate and then mixed after it exits from the extruder to raise the temperature of the extrudate to at least 95° C. to 130° C. prior to formation and recovery of the product.

7. The process of claim 1 wherein the product has a moisture content at least equal to the moisture content of the dough in spite of flash-off.

8. The process of claim 1 wherein sufficient steam is injected and mixed with the extrudate so that the moisture content of the product is at least 2 percent higher than the moisture content of the dough.

9. The process of claim 8 wherein the moisture content of the product is 15 percent to 60 percent.

10. The process of claim 9 wherein the moisture content of the product exceeds the moisture content of the dough by at least 2 to 20 percent and is 20 percent to 50 percent.

11. The process of claim 10 wherein sufficient steam is injected and mixed with the extrudate to raise the temperature of the product to at least 100° C. prior to recovery.

12. The process of claim 11 wherein sufficient steam is injected and mixed with the extrudate so that the extrudate temperature after steam injection and mixing exceeds the extruder exit temperature by at least 1C.°.

13. The process of claim 12 wherein sufficient steam is injected and mixed with the extrudate so that the extrudate temperature after steam injection and mixing exceeds the extruder exit temperature by at least 3C.° to 50C.°.

14. In an apparatus for heating and shaping a food comprising an extruder, a transfer means, and a recovery means, wherein said extruder has an extruder inlet means and an extruder outlet means;

said transfer means having a first end and a second end and a mixing means therebetween;

said extruder outlet means communicating with said first end of said transfer means; and said second end of said transfer means communicating with said recovery means;

the improvement comprising a steam injection means communicating with said transfer means at a point between said first end of said transfer means and said mixing means whereby said extruder steam injection means, mixing means and recovery means are interconnected.

15. The apparatus of claim 14 wherein the mixing means is a static inline mixer.

* * * * *